United States Patent
Zou et al.

(10) Patent No.: US 8,554,728 B2
(45) Date of Patent: Oct. 8, 2013

(54) METHOD AND SYSTEM FOR MANAGING A DISTRIBUTED TRANSACTION PROCESS

(75) Inventors: Kevin Zou, Austin, TX (US); Josh A. Wiles, Round Rock, TX (US); Pasquale Solitro, Round Rock, TX (US); Zheng Zhu, Austin, TX (US)

(73) Assignee: ACS State & Local Solutions, Inc., Washington, DC (US)

( * ) Notice: Subject to any disclaimer, the term of this patent is extended or adjusted under 35 U.S.C. 154(b) by 367 days.

(21) Appl. No.: 12/318,688

(22) Filed: Jan. 6, 2009

(65) Prior Publication Data

US 2009/0177709 A1    Jul. 9, 2009

Related U.S. Application Data

(63) Continuation of application No. 10/650,994, filed on Aug. 29, 2003, now Pat. No. 7,587,434.

(60) Provisional application No. 60/414,645, filed on Oct. 1, 2002, provisional application No. 60/430,941, filed on Dec. 5, 2002.

(51) Int. Cl.
    *G06F 7/00*    (2006.01)
(52) U.S. Cl.
    USPC .......................................................... 707/615
(58) Field of Classification Search
    USPC .......................................................... 707/615
    See application file for complete search history.

(56) References Cited

U.S. PATENT DOCUMENTS

| | | |
|---|---|---|
| 4,341,951 A | 7/1982 | Benton |
| 5,457,747 A | 10/1995 | Drexler et al. |
| 5,461,217 A | 10/1995 | Claus |
| 5,479,510 A | 12/1995 | Olsen et al. |
| 5,530,855 A | 6/1996 | Satoh et al. |
| 5,536,045 A | 7/1996 | Adams |
| 5,559,887 A | 9/1996 | Davis et al. |
| 5,577,121 A | 11/1996 | Davis et al. |
| 5,640,561 A | 6/1997 | Satoh et al. |
| 5,737,539 A | 4/1998 | Edelson et al. |
| 5,864,822 A | 1/1999 | Baker, III |

(Continued)

OTHER PUBLICATIONS

"Electronic Benefit Transfer—History," EBT History Page, Texas Health and Human Services Commission, (retrieved from www.hhsc.state.tx.us/providers/LoneStar/EBT/EBThistory.html on Sep. 4, 2008) (5 pages).

(Continued)

*Primary Examiner* — John Breene
*Assistant Examiner* — Joshua Bullock
(74) *Attorney, Agent, or Firm* — Finnegan, Henderson, Farabow, Garrett & Dunner, LLP (57) ABSTRACT

Systems and methods for managing a distributed transaction process include an active transaction manager that manages transactions with an active database, a latent transaction manager that manages transactions with a merge database, a transaction log that reflects the set of transactions in the active database that are not affiliated with the transactions in the merge database, and a merge manager that uses the transaction log to determine whether to transfer control of the merge database to the active transaction manager. Systems and methods may further instruct the active transaction manager to halt transactions with the active database while the merge database is updated to reflect a set of transactions affiliated with the set of transactions in the transaction log, and instruct the active transaction manager to subsequently manage transactions to the active database and the merge database.

26 Claims, 7 Drawing Sheets

(56) References Cited

U.S. PATENT DOCUMENTS

| | | | |
|---|---|---|---|
| 5,924,094 A * | 7/1999 | Sutter | 1/1 |
| 5,930,759 A | 7/1999 | Moore et al. | |
| 5,953,709 A | 9/1999 | Gilbert et al. | |
| 5,953,719 A * | 9/1999 | Kleewein et al. | 1/1 |
| 5,991,742 A | 11/1999 | Tran | |
| 6,014,635 A | 1/2000 | Harris et al. | |
| 6,061,660 A | 5/2000 | Eggleston et al. | |
| 6,067,522 A | 5/2000 | Warady et al. | |
| 6,094,644 A | 7/2000 | Hillson et al. | |
| 6,112,182 A | 8/2000 | Akers et al. | |
| 6,115,715 A | 9/2000 | Traversat et al. | |
| 6,129,275 A | 10/2000 | Urquhart et al. | |
| 6,169,974 B1 | 1/2001 | Baumgartner et al. | |
| 6,189,011 B1 | 2/2001 | Lim et al. | |
| 6,199,074 B1 * | 3/2001 | Kern et al. | 1/1 |
| 6,230,145 B1 | 5/2001 | Verderamo et al. | |
| 6,233,617 B1 | 5/2001 | Rothwein et al. | |
| 6,266,648 B1 | 7/2001 | Baker, III | |
| 6,282,522 B1 | 8/2001 | Davis et al. | |
| 6,299,062 B1 | 10/2001 | Hwang | |
| 6,324,528 B1 | 11/2001 | Hillson et al. | |
| 6,343,271 B1 | 1/2002 | Peterson et al. | |
| 6,347,739 B1 | 2/2002 | Tamam | |
| 6,401,079 B1 | 6/2002 | Kahn et al. | |
| 6,446,089 B1 | 9/2002 | Brodersen et al. | |
| 6,446,092 B1 * | 9/2002 | Sutter | 1/1 |
| 6,615,190 B1 | 9/2003 | Slater | |
| 6,616,189 B2 | 9/2003 | Raming | |
| 6,694,447 B1 * | 2/2004 | Leach et al. | 714/6 |
| 6,766,302 B2 | 7/2004 | Bach | |
| 6,808,111 B2 | 10/2004 | Kashef et al. | |
| 6,873,995 B2 * | 3/2005 | Benson et al. | 707/607 |
| 6,896,618 B2 | 5/2005 | Benoy et al. | |
| 6,915,265 B1 | 7/2005 | Johnson | |
| 6,915,266 B1 | 7/2005 | Saeed et al. | |
| 6,999,936 B2 | 2/2006 | Sehr | |
| 7,039,593 B2 | 5/2006 | Sager | |
| 7,054,838 B2 | 5/2006 | Sutton et al. | |
| 7,072,842 B2 | 7/2006 | Provost et al. | |
| 7,083,084 B2 | 8/2006 | Graves et al. | |
| 7,136,835 B1 | 11/2006 | Flitcroft et al. | |
| 7,149,724 B1 | 12/2006 | Flanagan et al. | |
| 7,165,049 B2 | 1/2007 | Slater | |
| 7,174,315 B2 | 2/2007 | Phillips et al. | |
| 7,206,805 B1 * | 4/2007 | McLaughlin, Jr. | 709/203 |
| 7,222,097 B2 | 5/2007 | Bellosguardo | |
| 7,290,056 B1 * | 10/2007 | McLaughlin, Jr. | 709/230 |
| 7,319,986 B2 | 1/2008 | Praisner et al. | |
| 7,774,273 B2 | 8/2010 | Neal et al. | |
| 7,865,437 B2 | 1/2011 | Neal et al. | |
| 7,925,518 B2 | 4/2011 | Lee et al. | |
| 8,185,470 B2 | 5/2012 | Neal et al. | |
| 2001/0034702 A1 | 10/2001 | Mockett et al. | |
| 2001/0047286 A1 | 11/2001 | Walker et al. | |
| 2001/0049638 A1 | 12/2001 | Satoh | |
| 2002/0010679 A1 | 1/2002 | Felsher | |
| 2002/0026329 A1 | 2/2002 | Saito et al. | |
| 2002/0091549 A1 | 7/2002 | Provost et al. | |
| 2002/0091635 A1 | 7/2002 | Dilip et al. | |
| 2002/0107849 A1 | 8/2002 | Hickey et al. | |
| 2002/0156676 A1 | 10/2002 | Ahrens et al. | |
| 2002/0165798 A1 | 11/2002 | Hausmann et al. | |
| 2003/0009355 A1 | 1/2003 | Gupta | |
| 2003/0069750 A1 | 4/2003 | Siegel et al. | |
| 2003/0069760 A1 | 4/2003 | Gelber | |
| 2003/0074234 A1 | 4/2003 | Stasny | |
| 2003/0083903 A1 | 5/2003 | Myers | |
| 2003/0093283 A1 | 5/2003 | Morsa | |
| 2003/0101136 A1 | 5/2003 | Wheeler et al. | |
| 2003/0163755 A1 * | 8/2003 | Fung et al. | 714/4 |
| 2003/0177150 A1 * | 9/2003 | Fung et al. | 707/204 |
| 2003/0191669 A1 | 10/2003 | Fitzgerald et al. | |
| 2003/0216967 A1 | 11/2003 | Williams | |
| 2003/0225760 A1 * | 12/2003 | Ruuth et al. | 707/5 |
| 2004/0006489 A1 | 1/2004 | Bynon | |
| 2004/0083173 A1 | 4/2004 | Reddihough et al. | |
| 2004/0093303 A1 | 5/2004 | Picciallo | |
| 2004/0128245 A1 | 7/2004 | Neal et al. | |
| 2005/0125320 A1 | 6/2005 | Boesen | |
| 2006/0116960 A1 | 6/2006 | Gillin et al. | |
| 2006/0218206 A1 * | 9/2006 | Bourbonnais et al. | 707/202 |
| 2007/0061251 A1 | 3/2007 | Watkins | |
| 2007/0094047 A1 | 4/2007 | Sager | |

OTHER PUBLICATIONS

"Texas' EBT System, The Lone Star Card," The Texas Lone Star Card, Electronic Benefits Transfer and Public Policy, (retrieved from www.utexas.edu/lbj/21cp/ebt/lonestar.htm on Sep. 4, 2008) (1 page).

"Electronic Benefits Transfer in the Public Sector," EBT in the Public Sector, Electronic Benefits Transfer and Public Policy, (retrieved from www.utexas.edu/lbj/21cp/ebt/publicsector.htm on Sep. 4, 2008) (1 page).

"Welfare Recipients are Joining the Age of Plastic," *The New York Times*, published Mar. 14, 1993 (retrieved from http://query.nytimes.com/gst/fullpage.html?res=9F0CE0D71E30F937A25750C0A965958260 on Thursday, Sep. 18, 2008) (4 pages).

Petersen, Jennifer, "Welfare with a Debit Card, States look to private firms to automate delivery of benefits," AllPolitics (retrieved from http://cnn.com/ALLPOLITICS/1998/08/12/ebt.monopoly/ on Sep. 18, 2008) (7 pages).

Pack, Thomas, "Stored-value cards offer new way to pay, give banks new product to sell," Business First of Louisville, Friday, Oct. 22, 2004 (retrieved from http://louisville.bizjournals.com/louisville/stories/2004/10/25/story2.html and http://louisville.bizjournals.com/louisville/stories/2004/10/25/story2.html?page=2 on Sep. 22, 2008) (5 pages).

Williams, Karen, "Prepaid Cards in the Public Sector: A World of Possibilities, Electronic payment applications for central and local governments," *Business Insight*, eFunds Corporation (retrieved from www.efunds.com/web/pdf/EFDPPrepaidGovernment.pdf on Sep. 4, 2008) (6 pages).

Leyser, Barbara, "Selected Characteristics of State EBT Systems," Jun. 2001 (retrieved from www.consumerlaw.org/initiatives/electronic_benefits/content/ebt_summary_table.pdf on Sep. 4, 2008) (7 pages).

National Child Support Enforcement Association, NCSEA News, Summer 1997 Conference Edition, vol. XXVII, No. 3 (4 pages).

Complaint for Declaratory Judgment and Patent Infringement, *JPMorgan Chase & Co. et al. v. Affiliated Computer Services, Inc. et al.*; (U.S.D.C. Del., Apr. 2008) (33 pages).

Public Law 104-193—Aug. 22, 1996, 110 STAT. 2105, 104th Congress (251 pages).

International Search Report PCT/US03/29982, dated Jun. 21, 2004 (7 pages).

"Another stab at private-label healthcare card programs", Credit Card News. Chicago: Oct. 1, 2000, p. 7 (1 page).

Anonymous, "Future Medicare, Medicaid claims may be filed by card", Card News. Potomac: Nov. 12, 1992. vol. 7, Iss:21; p. 1 (1 page).

Business and Medical Editors, "Imperial Technology Solutions Signs Product Licensing Agreement with Executive Healthcare Services", Business Wire. New York: Aug. 2, 1999, p. 1 (2 pages).

Business Editors/ High Tech Writers, "Sweden's Nationalised Pharmacy, Apoteket, Selects Hypercom Solutions; POS Equipment establishing itself in Healthcare Industry", Business Wire. New York: Feb. 20, 2001, p. 1 (3 pages).

Cherry, Norton, "Working mothers total has doubled in past 20 years WELCARE Childcare vouchers lead to a sharp rise in the numbers of women with children under five returning to work", The Independent. London (UK), Oct. 20, 1999 (2 pages).

Examiner's Answer to Appeal Brief for U.S. Appl. No. 10/379,733, mailed Aug. 30, 2010 (13 pages).

"Health insurance associations will be allowed to directly audit", Asahi Evening News. Tokyo: Apr. 16, 2002, p. 1 (1 page).

Interview Summary, dated Mar. 7, 2008, for U.S. Appl. No. 10/379,733, filed Mar. 6, 2003 (2 pages).

"Medical Care on a Card; Can a European import fix what ails America?", Inka Resch, Business Week, Sep. 14, 1998, Iss. 3595, New York (3 pages).

"More hospitals joining new emergency card network", Business World (Philippines), Aug. 16, 2001, p. 21 (2 pages).

"Neighborhood Health Partnership and Perot Systems Launch Web-Based Solutions for Providers", PR Newswire, New York: Apr. 12, 2000, p. 1 (3 pages).

Notice of Allowance and Fees Due, dated Apr. 28, 2010, for U.S. Appl. No. 10/631,472, filed Jul. 30, 2003 (26 pages).

Notice of Allowance and Fees Due, dated Apr. 3, 2009, for U.S. Appl. No. 10/650,994, filed Aug. 29, 2003 (12 pages).

Notice of Allowance and Fees Due, dated Oct. 7, 2008, for U.S. Appl. No. 10/650,994, filed Aug. 29, 2003 (19 pages).

Notice of Panel Decision from Pre-Appeal Brief Review, dated Feb. 4, 2009, for U.S. Appl. No. 10/379,733, filed Mar. 6, 2003 (2 pages).

Notice of Panel Decision from Pre-Appeal Brief Review, dated May 19, 2010, for U.S. Appl. No. 10/379,733, filed Mar. 6, 2003 (2 pages).

Notice of Panel Decision from Pre-Appeal Brief Review, dated Sep. 13, 2007, for U.S. Appl. No. 10/379,733, filed Mar. 6, 2003 (2 pages).

Odea, Clare, "Childcare voucher scheme brings many benefits", Irish Times, Apr. 19, 2002, Dublin (3 pages).

Office Action for U.S. Appl. No. 10/379,733, mailed Apr. 27, 2009 (11 pages).

Office Action for U.S. Appl. No. 10/379,733, mailed Apr. 28, 2005 (12 pages).

Office Action for U.S. Appl. No. 10/379,733, mailed Aug. 28, 2006 (10 pages).

Office Action for U.S. Appl. No. 10/379,733, mailed Dec. 13, 2007 (12 pages).

Office Action for U.S. Appl. No. 10/379,733, mailed Feb. 18, 2010 (11 pages).

Office Action for U.S. Appl. No. 10/379,733, mailed Jan. 18, 2007 (12 pages).

Office Action for U.S. Appl. No. 10/379,733, mailed Jul. 22, 2009 (10 pages).

Office Action for U.S. Appl. No. 10/379,733, mailed Mar. 15, 2005 (5 pages).

Office Action for U.S. Appl. No. 10/379,733, mailed Mar. 17, 2006 (11 pages).

Office Action for U.S. Appl. No. 10/379,733, mailed Mar. 21, 2008 (12 pages).

Office Action for U.S. Appl. No. 10/379,733, mailed May 21, 2007 (12 pages).

Office Action for U.S. Appl. No. 10/379,733, mailed Oct. 1, 2008 (12 pages).

Office Action for U.S. Appl. No. 10/379,733, mailed Sep. 20, 2005 (11 pages).

Office Action for U.S. Appl. No. 10/631,472, mailed Dec. 4, 2007 (77 pages).

Office Action for U.S. Appl. No. 10/631,472, mailed Feb. 20, 2009 (23 pages).

Office Action for U.S. Appl. No. 10/631,472, mailed Jan. 6, 2009 (24 pages).

Office Action for U.S. Appl. No. 10/631,472, mailed Jul. 9, 2008 (65 pages).

Office Action for U.S. Appl. No. 10/631,472, mailed Oct. 16, 2009 (23 pages).

Office Action for U.S. Appl. No. 10/650,994, mailed Apr. 2, 2008 (23 pages).

O'Hara, Collen, et al., "Feds, states pilot smart health cards", Federal Computer Week, May 17, 1999, vol. 13, Iss. 15, Falls Church (3 pages).

"Supporting HIPPA Compliance and Streamlining Workflow: HDX Forms Agreement with IDX to Provide-All Payer Solution", Business Wire, Jul. 11, 2001 (3 pages).

Notice of Allowance, dated Aug. 16, 2012, for U.S. Appl. No. 10/379,733, filed Mar. 6, 2003.

Business and Medical Editors, "Imperial Technology Solutions Signs Product Licensing Agreement with Executive Healthcare Services," Business Wire, New York, Aug. 2, 1999. 2 pgs.

Business Editors/High Tech Writers, "Sweden's Nationalised Pharmacy, Apoteket, Selects Hypercom Solutions; POS Equipment Establishing Itself in Healthcare Industry," Business Wire, New York, Feb. 20, 2001. 3 pgs.

"More Hospitals Joining New Emergency Card Network," Business World, Philippines, p. 21, Aug. 16, 2001. 1 pg.

Notice of Allowance issued Sep. 21, 2012, for U.S. Appl. No. 13/476,779, filed May 21, 2012 (13 pages).

Business Editors, "Hypercom, California Dental, Imperial Technology Solutions to Integrate Automated Payment Processing in 22,000 Dentist Offices," Business Wire. New York: Nov. 23, 1998, 3 pgs.

"New Card Saves Hispanic Customers Money on Healthcare," PR Newswire, Apr. 9, 1999, 1 pg.

Anonymous, "Prepaid cards: successful smart card pilot piques interest of Canadian government," EFT Report, New York: Sep. 30, 1991, vol. 14, iss. 20, 1 pg.

Business Editors/High Tech Writers, "Promise of Consumer Benefits From Smart Cards Depends on New Technology Infrastructure to Become Widespread Reality," Business Wire. New York: Oct. 27, 1998, 3 pgs.

"Supporting HIPAA Compliance and Streamlining Workflow: HDX Forms Agreement with IDX to provice All-Payer Solution," Business Wire, Jul. 11, 2011, 4 pgs.

Brennock, Mark, "Budget may deliver big rise in child benefit payments," Irish Times, Nov. 20, 2000, 2 pgs.

Resch, Inka, "Medical Care on a Card: Can a European import fix what ails America?" Business Week, New York: Sep. 14, 1998, iss. 3595; 2 pgs.

\* cited by examiner

METHOD AND SYSTEM FOR MANAGING A DISTRIBUTED TRANSACTION PROCESS

This application is a continuation of application Ser. No. 10/650,994, filed Aug. 29, 2003 now U.S. Pat. No. 7,587,434, which claims priority under 35 U.S.C. §119 based on U.S. Provisional Application No. 60/414,645, filed Oct. 1, 2002 and U.S. Provisional Application No. 60/430,941, filed Dec. 5, 2002 the complete disclosures of which are incorporated herein by reference. In addition, this application is related to U.S. patent application Ser. No. 10/379,733 filed Mar. 6, 2003 and entitled "Systems And Methods For Electronically Processing Government Sponsored Benefits," the complete disclosure of which is herein incorporated by reference.

TECHNICAL FIELD

This invention is related to data management, and more particularly to a method and system for managing a distributed transaction process, such as merging a database into a distributed transaction system. For example, one embodiment relates to recovering a distributed transaction process following the loss of one database member of the distributed transaction.

BACKGROUND

The recent growth of networking technologies, as, for example, those associated with the Internet, has helped to cause a shift in the manner in which databases are maintained and used. For example, applications and associated databases that were typically local and in a one-to-one relationship have migrated to wide-area-networks (WANs) with many client applications associated with one centralized server and database. Despite numerous advantages associated with a centralized database configuration, one drawback associated with such a configuration is the vulnerability of the entire system to a single failure in the centralized database.

Such a failure may affect the security of the data stored and the reliability of the system in general. For example, financial institutions such as banks typically maintain proprietary customer data that is accessed for the purpose of both reading from existing customer records as well as writing to such records. Accordingly, the content of such a data collection is time dependent. As this customer data is accessed, it is vulnerable to system failures that may occur in the course of such access.

To avoid a complete catastrophic loss of customer data, a backup copy of the data is conventionally maintained. Where the primary data collection is time dependent and where backup copies are created at certain time intervals, the backup copies will correspond to "snapshots" of the primary data collection at specific intervals of time. During the time intervals between the creation of backup copies, there will occur some "latency" in the data content of the primary data collection and the backup data collection.

More recently, in an effort to address some of the security and reliability concerns mentioned above, there has been an interest in more complex networking configurations that are decentralized. One example of such a configuration makes use of what is referred to as a "distributed transaction." Where a conventional transaction involves the reading, writing, or updating of a database record in a single database, a distributed transaction involves the reading, writing, or updating of a database record in a plurality of databases, where the plurality of databases may be redundant databases.

There are various technologies such as clustered operating and database systems, storage disk-based data replication, and database replication systems to provide instant redundant data. As used herein, "instant redundant data" implies a latency time between a first database and a second database (which may be a backup of the first database or merely a related database) that is optimally or arbitrarily small. For example, the latency time between a first database physically located in New York and a second database physically located in Los Angeles is at least equal to the amount of time required for communication between such locations.

Figure 1:
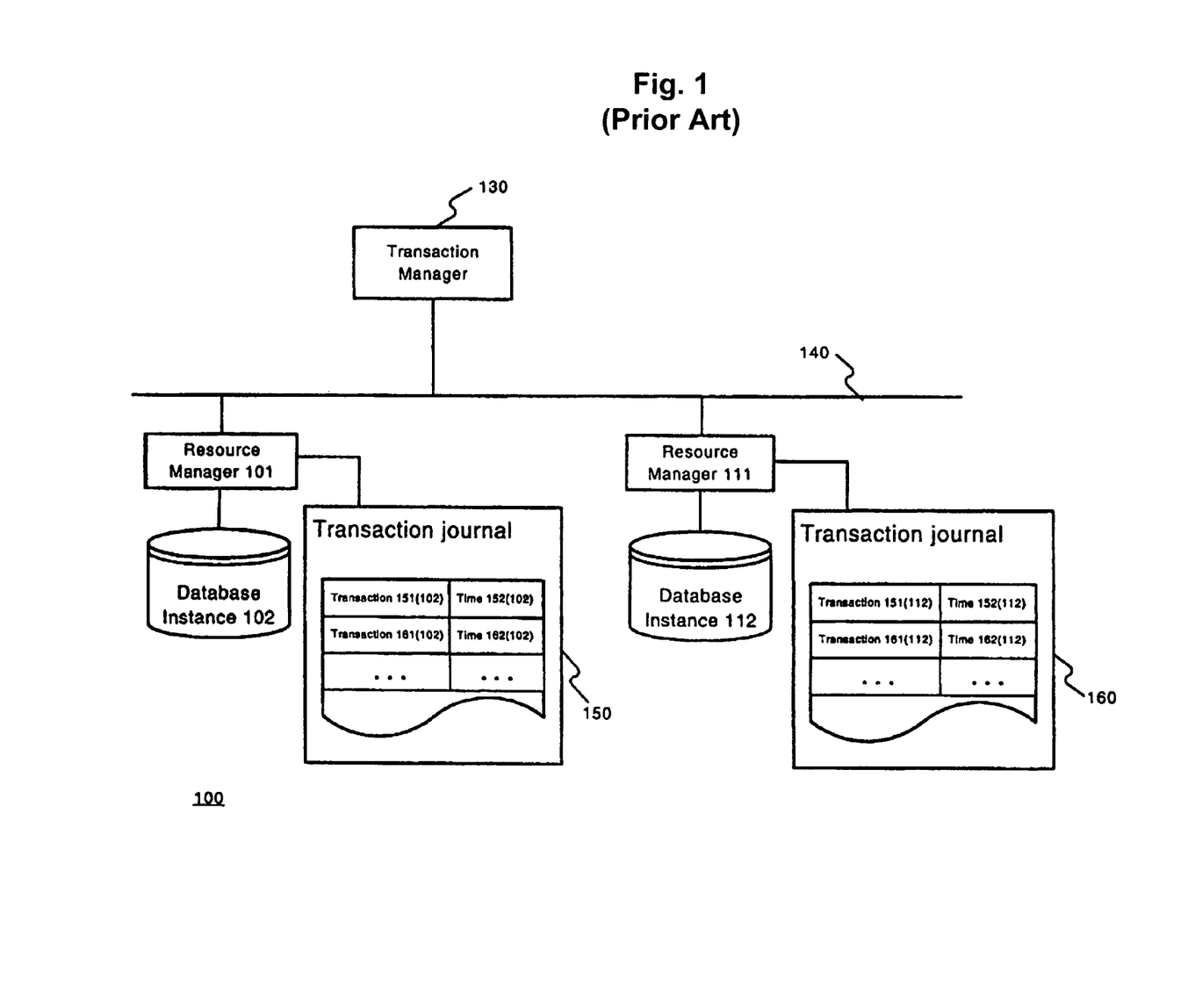
FIG. 1 is a system that performs distributed transaction processing from the prior art.

FIG. 1 depicts an example of a distributed transaction system of the prior art. More generally, a conventional distributed transaction will occur across, for example, two or more databases and is generally processed in what is referred to as an "ACID" way. As used herein, "ACID" is an acronym for Atomic, Consistent, Isolation, and Durable. The term "atomic" is intended to indicate, for example, that every database either commits to the operation (reading, writing, or updating) or the operation aborts. It is the "all or nothing" sense of the operation that is "atomic," or indivisible. The term "consistent" is intended to indicate that the entire operation transforms the set of databases from one consistent state to another consistent state. The term "isolation" is intended to indicate that each operation is independent of other operations. For example, the incompleteness of one transaction should not impact other transactions. Finally, the term "durable" is intended to indicate that the effects of the operation performed in a distributed way is permanent.

Returning now to FIG. 1, we observe that a transaction manager 130 communicates with a database instance 102 and a database instance 112 through a resource manager 101 and a resource manager 111 respectively over a network 140. One skilled in the art will appreciate that resource manager 101 and database instance 102 may be physically part of one complete computer system including its own CPU and memory in addition to the long-term storage that may be more particularly associated with database instance 102. The same may be true for resource manager 111 and database instance 112.

As depicted in FIG. 1, each of the resource managers maintains a transaction journal that reflects previous transactions that have been proposed by transaction manager 130 and that have been committed to by the respective resource managers and databases and the time associated with the transaction. One skilled in the art will appreciate that such transaction journals may also include information about transactions that have not been committed to or that have been rolled back. In addition, one skilled in the art will appreciate that the transactions and the time associated with the transactions may not be completely identical as implemented in each database instance.

If the databases are exact duplicates, then the transactions will generally be duplicate transactions. However, if the databases are not intended to be exact duplicates, but, rather, are intended to function with data in some one-to-one manner, then the transactions may not be exact duplicates. This dependency of the transaction upon the database is indicated in FIG. 1 by including the database reference number parenthetically with the transaction reference number. More specifically, if database instance 102 is identical to database instance 112, then transaction 151(102) should be identical to transaction 151(112). On the other hand, if database instance 102 is not identical to database instance 112, transaction 151(102) may not be exactly the same as transaction 151(112). This may occur, for example, when database instance 102 is a set of employee records for a company's human resource department including both confidential information and non-confidential information, and database instance 112 is a database of employee records to be accessed by a publicly available web server with only non-confidential information. In such an instance, the two databases may not contain all the same information; however, the records contained in each database are correlated in a one-to-one manner and may be processed according to a conventional distributed transaction.

Moreover, one skilled in the art will also appreciate, regardless of whether the databases used in the distributed transaction process are completely identical, the respective time associated with a transaction in each respective database will vary. The dependency of the time associated with a given transaction upon the database is indicated in FIG. 1 by including the database reference number parenthetically with the time reference number. Accordingly, although time 151(102) may correspond to exactly to affiliated time 151(112), one skilled in the art will appreciate that, in fact, there will occur some variation in the values of affiliated times 152(102) and 152(112). As mentioned above, if database instance 102 is physically located, for example, in New York and database instance 112 is physically located in Los Angeles, then one might expect that the variation between affiliated times 152(102) and 152(112) is comparable to the amount of time required to physically communicate between the two database instances.

In addition, the "atomic" nature of the transaction is illustrated in the following example. Suppose that transaction manager 130 proposes a new transaction (transaction 171, for example, not depicted) and database instance 102 commits while database instance 112 is not able to commit. In that instance, transaction manager 130 will conventionally instruct resource manager 101 to rollback or undo the committed transaction 171(102) (not depicted) in database instance 102. In this manner, the "atomic" nature of the distributed transaction is preserved.

Even though the above example involves only two databases, one skilled in the art will appreciate that a distributed transaction may occur across any number of databases.

Conventionally, systems that support distributed transactions are costly, and platform and vendor dependent. In addition, conventional systems that support distributed transactions will only support automatic or manual fail-over. As used herein, a "fail-over" is a process whereby, for example, a database cannot participate in a distributed transaction due to some critical exception, that is, becomes "sick." Following the critical exception, the transaction processing service will exclude the sick database and subsequently utilize the remaining active database(s) (the "healthy" databases).

As used herein, a "critical exception" refers to a failure of the ability of one database to continually record proposed transactions such that repeated undoing or roll-back of the transaction in other databases (due to the "atomic" nature of the process) is too costly for the system. One skilled in the art will appreciate that the "critical exception" level of failure of one database is generally determined by the judgment of the operator of the system. Although such automatic fail-over support may be provided by a vendor, there is no commercially available fail-back solution in which the sick database automatically recovers and merges back into the distributed system. As used herein, a "fail-back" refers to the process whereby, for example, the recovered sick database (which has been made "healthy") is automatically merged back into future distributed transactions.

As stated above, in the case where any one database repeatedly fails to commit to a transaction, (a "sick database") then transaction manager 130 will conventional switch into a "fail-over" mode where the sick database is automatically excluded from future proposed transactions and a notification may be generated for an administrator. An administrator may then determine the status of the sick database, perform whatever operation may be required in order that it is "healthy" again, and then manually merge the database back into the distributed system.

Such a manual merge operation may involve, for example, shutting the distributed system down in its entirety for a time period while the records in the healthy database are updated to be redundant with the records in the other databases. During this time period, the distributed transaction system is unavailable for use.

Accordingly, there is a need for a method and system to automatically merge a database into a distributed database system without manually shutting down the distributed transaction system.

SUMMARY

Methods and systems consistent with the present invention relate to managing a distributed transaction process. One embodiment, for example, relates to recovering a distributed transaction process following the loss of one database member of the distributed transaction.

To support fail-back, one embodiment utilizes a transaction journal that stores all the updates to a first database and a second database. The embodiment also contemplates, without limitation, that the transaction journal entries are in the order in which the transactions occurred. For example, and without limitation, there may be a unique identifier for each transaction. In addition, and consistent with the present invention, the transaction journal may contain information about a database identifier for the last successful transaction.

During the recover process, one embodiment automatically detects any discrepancies between each failed databases and the information in the transaction journal. The embodiment may then automatically send the transactions from the transaction journal to those failed databases in order for the failed databases to catch up to the healthy database serving as the active database. In the meantime the active databases can continue accept the ongoing live transactions (the "active" transactions) and the transaction journal continues the logging process.

Once the discrepancy between the recovered database and the active database is reduced to a configurable threshold, the embodiment temporarily halts all transactions to the active databases. During the period in which all transactions to the active databases are halted, the recovered databases may complete the catch-up process reducing the data latency between the databases to zero, or arbitrarily close to zero. Accordingly, within seconds, for example, the databases should be completely synchronized. At this point, the embodiment contemplates an automatic resumption of distributed transactions using all active and recovered databases.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments and together with the description, serve to explain the principles of the invention.

In the drawings.

DESCRIPTION OF THE EMBODIMENTS

A method and system for managing a distributed transaction process is described below. In the following description, numerous exemplary details are set forth to provide an understanding of a preferred embodiment of the present invention.

Figure 2:
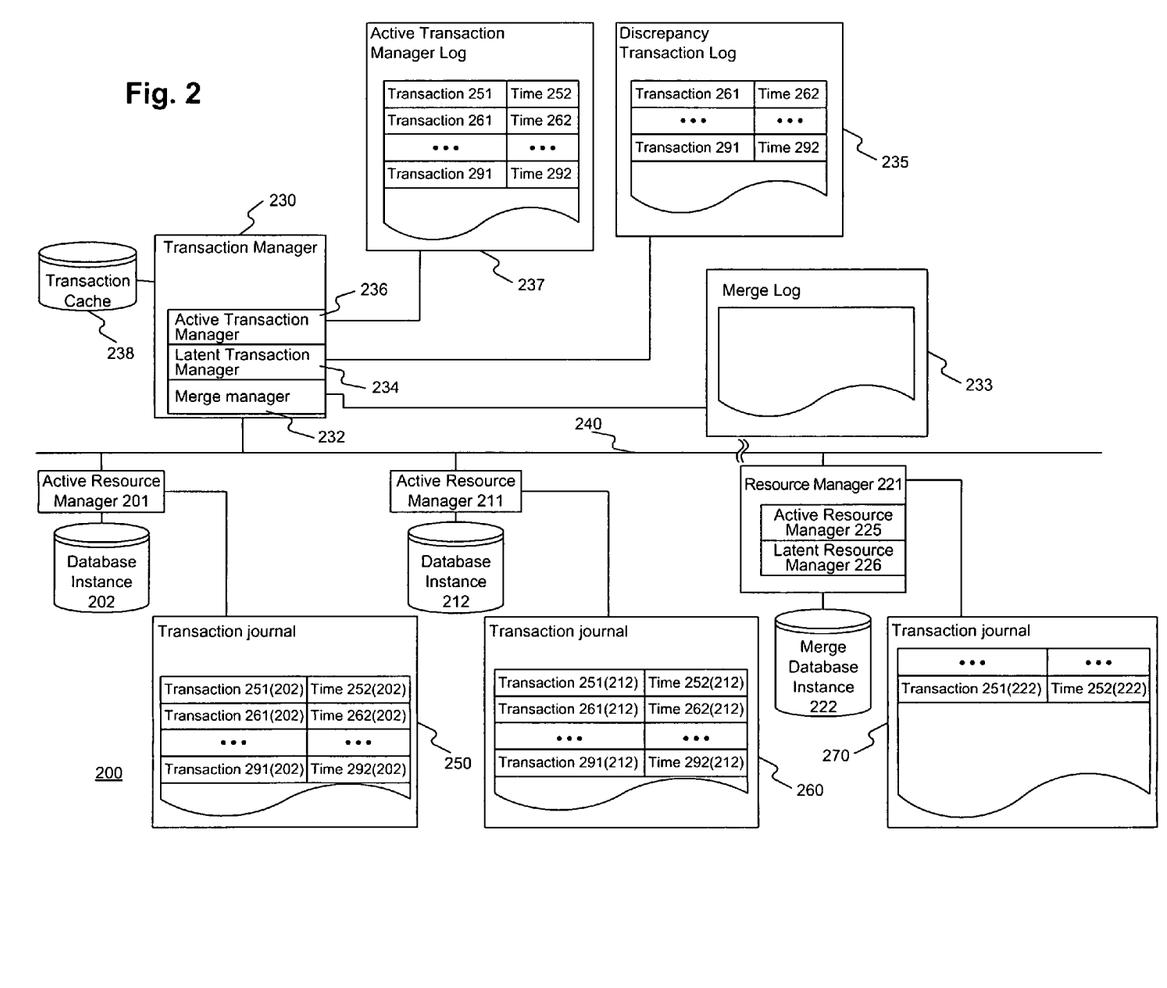
FIG. 2 depicts a view of a system for managing a distributed transaction process consistent with methods and systems of the present invention at time 292 before the merge database begins the catch-up process.

In a preferred embodiment depicted in FIG. 2, a system for managing a distributed transaction includes a transaction manager 230, an active transaction manager 236, a latent transaction manager 234 and a merge manager 232. The above managers are connected via a network 240 to a database instance 202, a database instance 212, and a merge database instance 222. As with the prior art system depicted in FIG. 1, one skilled in the art will appreciate that an active resource manager 201 and active database instance 202 may be physically part of one complete computer system including its own CPU and memory in addition to the long-term storage that may be more particularly associated with active database instance 202. The same may be true for an active resource manager 211 and active database instance 212, and a resource manager 221 and merge database instance 222. Moreover, although database instance 202, database instance 212, and database instance 222 may be associated with long-term storage, the corresponding database instances may also be associated with memory records loaded into temporary storage, such as RAM.

The system in FIG. 2 is depicted at an instant of time 292 when merge database instance 222 is not participating in active distributed transactions. The database instances that are part of the active distributed transactions include database instance 202 and database instance 212. This is depicted in FIG. 2, in part, through the entries in a transaction journal 250 and a transaction journal 260, which indicate an affiliation with the transaction entries in an active transaction manager log 237. For example, a transaction 251 in active transaction manager log 237 is affiliated with a transaction 251(202) in transaction journal 250 and a transaction 251(212) in transaction journal 260. This affiliation between the transactions in activate transaction manager log 237 and those in transaction journal 250 and transaction journal 260 continue through a transaction 291 in active transaction manager log 237, a transaction 291(202) in transaction journal 250, and a transaction 291(212) in transaction journal 260. The transaction entries in transaction journal 270, however, are depicted as concluding with a transaction 251(222), which is affiliated with transaction 251 in active transaction manager log 237. There are no transactions depicted in transaction journal 270 that are affiliated with transactions 261-291 itemized in active transaction manager log 237. Such a system may result, for example, where merge database instance 222, at and before a time 252(222), participated in active distributed transactions with database instance 202 and database instance 212. Following time 252(222), however, merge database instance 222 may have experienced a critical exception which prevented it from committing to a transaction affiliated with transaction 261 in active transaction manager log 237. Active transaction manager 236 may have decided to exclude merge database instance 222 from future distributed transactions due to a determination that the cost of rolling-back transactions in database instance 202 and database instance 212 exceeded the cost of simply excluding merge database instance 222 from future distributed transactions. Accordingly, the last affiliated transaction entry in transaction journal 270 before merge database instance 222 was excluded is affiliated transaction 251(222).

In the embodiment depicted in FIG. 2, we assume that the problem which gave rise to the critical exception in merge database 222 has been fixed and that merge database 222 is, at the current time, capable of participating in future distributed transactions, except for the fact that merge database instance 222 is not up to date with the transactions that have ensued since it was excluded (i.e., transactions 261-291 in active transaction manager log 237).

Accordingly, in the system depicted in FIG. 2, active transaction manager 236 is continuing to manage active distributed transactions in database instance 202 and database instance 212 through active resource manager 201 and active resource manager 211, respectively. Moreover, at the time depicted in FIG. 2, an active resource manager 225 associated with merge database instance 222 is not managing any changes to merge database instance 222. Rather, a latent resource manager 226 will be managing changes to merge database instance 222 in conjunction with a latent transaction manager 234 as described in more detail below. Moreover, a merge manager 232, in part, performs the function of determining when to hand control of merge database instance 222 to active resource manager 225 and active transaction manager 236. One skilled in the art will appreciate that this will occur when the transactions that have been recorded in merge database instance 222 are up-to-date with the active transactions that have been committed to in database instance 202 and database instance 212.

As mentioned above, latent transaction manager 234 in FIG. 2 manages transactions to merge database instance 222 through latent resource manager 226. In order to assist in this process, latent transaction manager 234 in a preferred embodiment may make use of a discrepancy transaction log 235. As depicted in FIG. 2, discrepancy transaction log 235 identifies all of the transactions or affiliated transactions that have ensued up to time 292 (the instant in time depicted in FIG. 2) but that have not been applied to merge database instance 222. As stated above, these discrepancy transactions include transactions 261-291. For the purpose of illustration only, we assume that this is a list of N1 transactions (where, for example, N1=1,000). Accordingly, in a first step consistent with the present invention, latent transaction manager 234 applies the N1 transactions in discrepancy transaction log 235 to merge database instance 222. During the time period that this is occurring, active transaction manager 236 continues to accept additional transactions to apply to database instance 202 and database instance 212.

Again, for the purpose of illustration only, we assume that the time it takes to apply all N1 transactions to merge database instance 222 extends from time 292 to a time 392. The resulting system at time 392 is depicted in FIG. 3.

Figure 3:
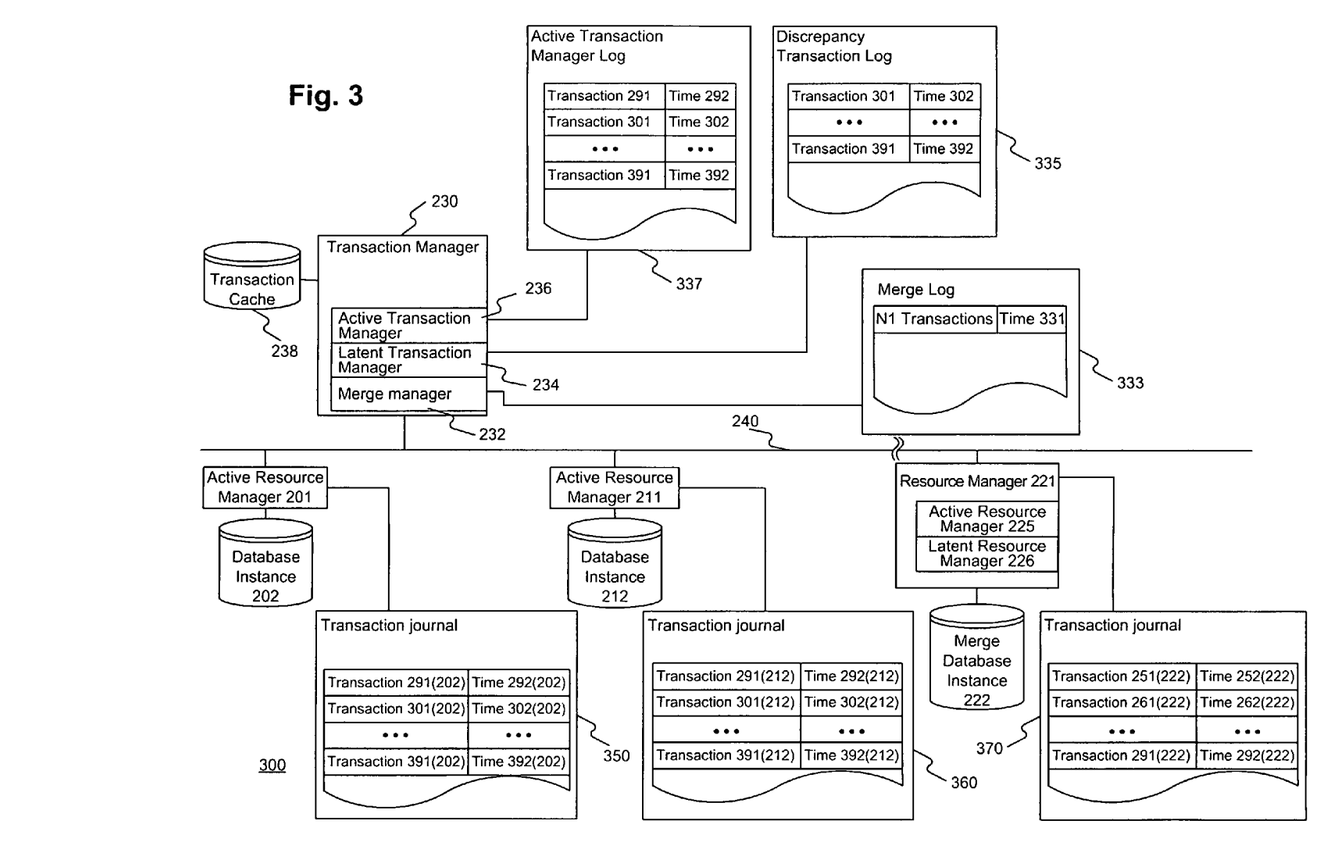
FIG. 3 depicts a view of a system for managing a distributed transaction process consistent with methods and systems of the present invention at time 392 after a first iteration of a catch-up process.

The system depicted in FIG. 3 is similar to the system of FIG. 2, with the following exceptions: transaction journal 250 in FIG. 2 has been updated to a transaction journal 350 in FIG. 3; transaction journal 260 in FIG. 2 has been updated to a transaction journal 360 in FIG. 3; active transaction manager log 237 in FIG. 2 has been updated to an active transaction manager log 337 in FIG. 3; discrepancy transaction log 235 in FIG. 2 has been updated to a discrepancy transaction log 335 in FIG. 3; and merge log 233 in FIG. 2 has been updated to a merge log 333 in FIG. 3.

In each instance, the respective journals and logs are consistent with the system of FIG. 2 at a later time: time 392. Accordingly, all of the entries have the same meaning as their counterparts in FIG. 2. In the embodiment depicted in FIG. 3, however, merge log 333 now includes an entry. Specifically, the entry in merge log 333 indicates that the set of N1 transactions listed in discrepancy transaction log 235 in FIG. 2 have now been applied to merge database instance 222, and took a time 331 to perform. For example, time 331 may be the simple difference between a time 292 (the time associated with the system of FIG. 2 before the N1 transactions were applied to merge database instance 222) and a time 392 (the time associated with the system of FIG. 3 after the N1 transactions have been applied to merge database instance 222).

Merge manager 232 in a preferred embodiment may record this information in order to decide whether to transfer control of merge database instance 222 to active transaction manager 236 and active resource manager 225. For the purpose of illustration only, we assume that merge manager 232 at the time depicted in FIG. 3 has not yet decided to transfer control of merge database instance 222 to active transaction manager 236 and active resource manager 225. Rather, we assume that merge manager 232 has decided that additional discrepancy transactions need to be applied to merge database instance 222. As depicted in FIG. 3, the list of discrepancy transactions at time 392 is in discrepancy transaction log 335: the transactions 301-391.

Accordingly, as was the case in depicting the system at time 292 in FIG. 2, for the purpose of illustration only, we assume that the list of discrepancy transactions (transactions 301-391) is a list of N2 transactions (where, for example, N2=300). Accordingly, in a second step consistent with the present invention, latent transaction manager 234 applies the N2 transactions in discrepancy transaction log 335 to merge database instance 222. During the time period that this is occurring, active transaction manager 236 again continues to accept additional transactions to apply to database instance 202 and database instance 212.

Again, for the purpose of illustration only, we assume that the time it takes to apply all N2 transactions to merge database instance 222 extends from time 392 to a time 492. The resulting system at time 492 is depicted in FIG. 4.

Figure 4:
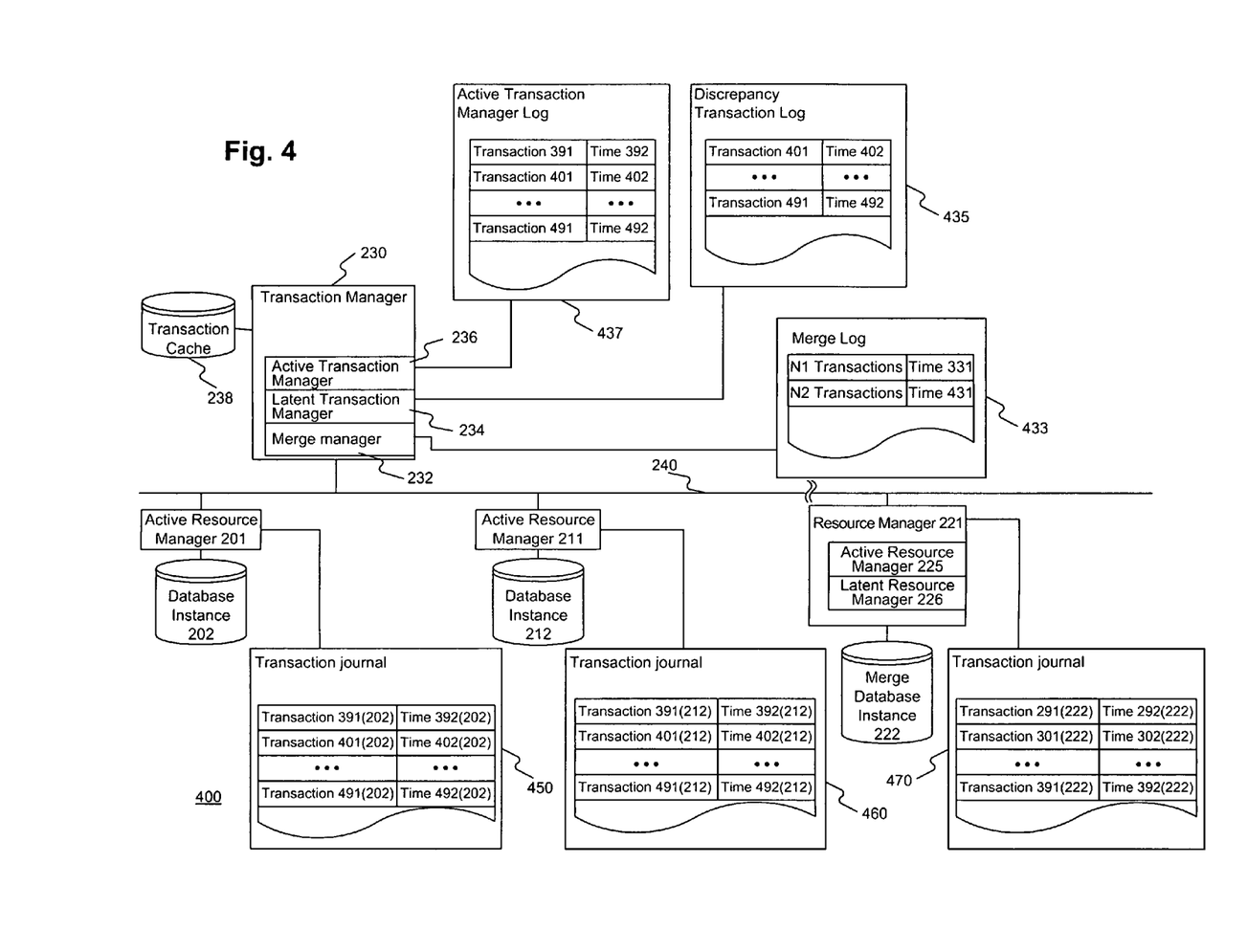
FIG. 4 depicts a view of a system for managing a distributed transaction process consistent with methods and systems of the present invention at time 492 after a second iteration of a catch-up process.

Again, the system depicted in FIG. 4 is similar to the system of FIG. 3, with the following exceptions: transaction journal 350 in FIG. 3 has been updated to a transaction journal 450 in FIG. 4; transaction journal 360 in FIG. 3 has been updated to a transaction journal 460 in FIG. 4; active transaction manager log 337 in FIG. 3 has been updated to an active transaction manager log 437 in FIG. 4; discrepancy transaction log 335 in FIG. 3 has been updated to a discrepancy transaction log 435 in FIG. 4; and merge log 333 in FIG. 3 has been updated to a merge log 433 in FIG. 4.

Again, the respective journals and logs are consistent with the system of FIGS. 2 and 3 at a later time: time 492. Accordingly, as before, all of the entries have the same meaning as their counterparts in FIGS. 2 and 3. In addition, as depicted in FIG. 4, merge log 433 includes an updated entry corresponding to the discrepancy update applied to merge database instance 222 between the time period of FIG. 3 and the time period of FIG. 4. In FIG. 4, the updated entry in merge log 433 indicates that the set of N2 transactions listed in discrepancy transaction log 335 in FIG. 3 have now been applied to merge database instance 222, and took a time 431 to perform. Again, as before, time 431 may be the simple difference between time 392 (the time associated with the system of FIG. 3 before the N2 transactions were applied to merge database instance 222) and time 492 (the time associated with the system of FIG. 4 after the N2 transactions have been applied to merge database instance 222).

Again for the purpose of illustration only, we assume that merge manager 232 at the time depicted in FIG. 4 has not yet decided to transfer control of merge database instance 222 to active transaction manager 236 and active resource manager 225. Rather, we assume that merge manager 232 has decided that additional discrepancy transactions need to be applied to merge database instance 222. As depicted in FIG. 4, the list of discrepancy transactions at time 492 is in discrepancy transaction log 435: the transactions 401-491.

One skilled in the art will appreciate that the series of iterations depicted in FIGS. 2-4 may continue until the number of discrepancy transactions in discrepancy transaction log 435 are at a level at which the cost of temporarily pausing the active transactions to database instance 202 and database instance 212 while merge database instance 222 is finally updated to include the last active affiliated transaction is at an acceptable level. While the active transactions to database instance 202 and database instance 212 are paused, transaction manager 230 may temporarily store pending active transactions in a transaction cache 238. After the last affiliated active transaction has been applied to merge database instance 222, merge manager 232 may direct control of merge database instance 222 from latent transaction manager 234 and latent resource manager 226 to active transaction manager 236 and active resource manager 225. At this point, all of database instance 202, database instance 212, and merge database instance 222 will participate in active distributed transactions. Accordingly, the addition of merge database instance 222 to the distributed transaction system depicted in FIGS. 2-4 has been completed.

Figure 5:
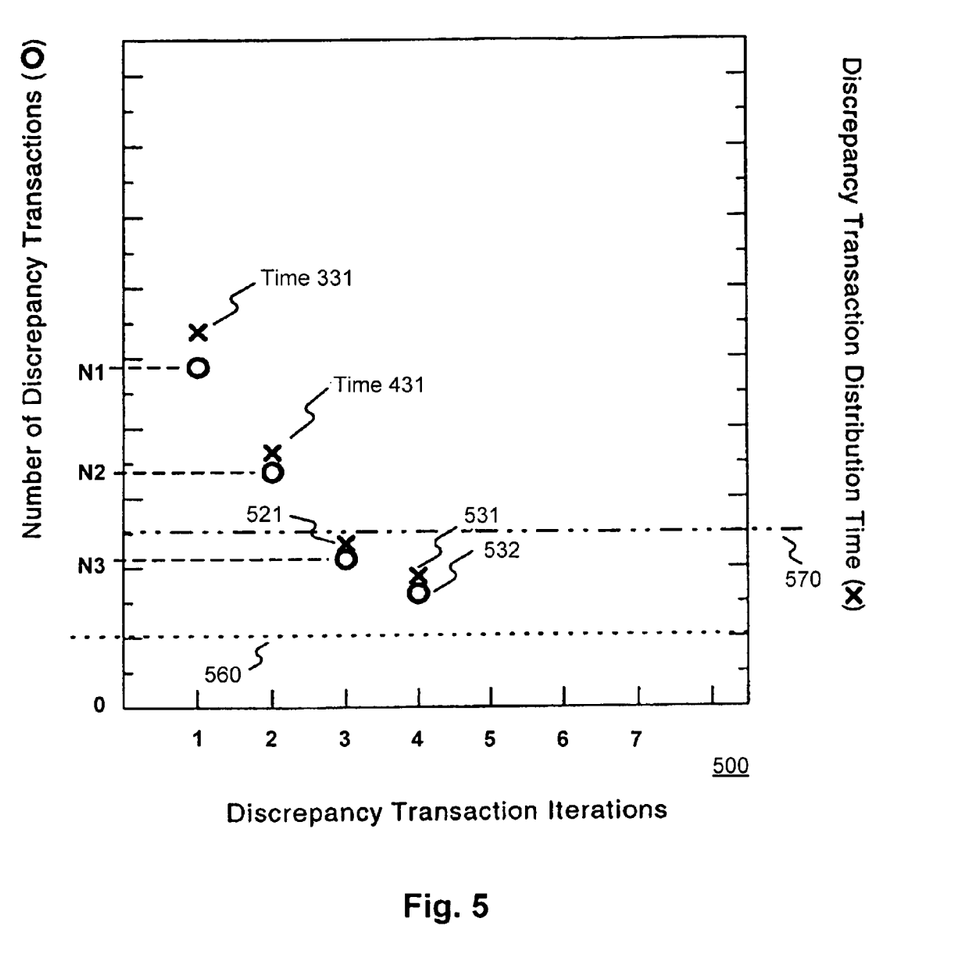
FIG. 5 depicts a graphical representation of the catch-up process consistent with methods and systems of the present invention as well as a graphical representation of exemplary asymptotes to trigger the addition of the merge database into the active distributed transactions.

FIG. 5 is a graphical representation of the iterations depicted in FIGS. 2-4. Specifically, the coordinates on the abscissa are related to the number of discrepancy transaction iterations that latent transaction manager 234 applies to merge database instance 222. The iteration labeled "1" on the abscissa corresponds to the transformation of the system from FIG. 2 to FIG. 3. The ordinate on the left corresponds to the number of discrepancy transactions applied to merge database instance 222 in one iteration, and the ordinate on the right corresponds to the amount of time required for the set of discrepancy transactions to be applied to merge database instance 222 in one iteration. Accordingly, the number of discrepancy transactions associated with iteration "1" in FIG. 5 is N1, and the amount of time associated with iteration "1" is time 331. Likewise, the iteration labeled "2" on the abscissa in FIG. 5 corresponds to the transformation of the system from FIG. 3 to FIG. 4, where the number of discrepancy transactions associated with iteration "2" in FIG. 5 is N2, and the amount of time associated with iteration "2" is time 431.

The sequence of iterations depicted in FIG. 5 is exemplary only, and indicates a general trend downward towards some point low on the ordinate scale. One skilled in the art will appreciate, however, that the trend may not necessarily follow such a smooth downward path towards the abscissa. For example, one skilled in the art will appreciate that the ongoing active transactions that determine the subsequent number of discrepancy transactions may be submitted to the system in a random or a bursty manner. Specifically, the number of active transactions that are processed by database instance 202 and database instance 212 during a time period when merge database instance 222 is being updated may be zero or may hit some maximum value. However, to the extent that the amount of time required for merge database instance 222 to commit to a discrepancy transaction is of the same order of magnitude as the amount of time required for a distributed transaction to be committed to by both database instance 202 and 212, the general trend of a curve such as that depicted in FIG. 5 is expected to decrease as a function of iterations.

As stated earlier with regard to FIG. 4, merge manager 232 may determine at some point in time that the cost of temporarily pausing the active transactions to database instance 202 and database instance 212 while merge database instance 222 is finally updated to include the last active affiliated transaction is at an acceptable level. Such a determination by merge manager 232 is illustrated in FIG. 5 by an asymptote 560 and an asymptote 570. For example, asymptote 560 is illustrated to correspond to some overall number of discrepancy transactions on the left ordinate. Accordingly, merge manager 232 may determine that the number of discrepancy transactions in a discrepancy transaction log 435 is at or below some threshold depicted in FIG. 5 by asymptote 560. At this point, as discussed earlier, merge manager 232 may direct active transaction manager 236 to pause all active transactions to database instance 202 and database instance 212 until merge database instance 222 is finally caught up to the last affiliated transaction. After this time, merge manager 232 may direct control of merge database instance 222 from latent transaction manager 234 and latent resource manager 226 to active transaction manager 236 and active resource manager 225. At this point, all of database instance 202, database instance 212, and merge database instance 222 will participate in subsequent active distributed transactions.

Alternatively, merge manager 232 may decide to transfer control of merge database instance 222 to active transaction manager 236 and active resource manager 225 according to asymptote 570. For example, asymptote 570 is illustrated to correspond to a selected overall discrepancy transaction distribution time on the right ordinate. Accordingly, merge manager 232 may determine that the amount of time required to update merge database instance 222 with the discrepancy transactions in discrepancy transaction log 435 is at or below the threshold depicted in FIG. 5 by asymptote 570. Again, as discussed earlier, merge manager 232 directs active transaction manager 236 to pause all active transactions to database instance 202 and database instance 212 while merge database instance 222 is finally caught up to the last affiliated transaction. After this time, merge manager 232 may direct control of merge database instance 222 from latent transaction manager 234 and latent resource manager 226 to active transaction manager 236 and active resource manager 225. At this point, again, all of database instance 202, database instance 212, and merge database instance 222 will participate in subsequent active distributed transactions.

Merge manager 232 may calculate a discrepancy transaction distribution time associated with an asymptote 570 according to a selected algorithm. For example, merge manager may be able to estimate the amount of time per transaction according to the existing affiliated times 302(222)-392 (222), or in any other manner. Merge manager 232 may also examine the current range of distribution times represented by, for example, affiliated times 302(202)-392(202) in transaction journal 350 (FIG. 3), affiliated times 302(212)-392 (212) in a transaction journal 360, and affiliated times 302-392 in discrepancy transaction log 335. For example, merge manager 232 may calculate a "characteristic distribution time" per transaction represented, for example, by the average of: MAX(time 302, time 302(202), time 302(212))−MIN (time 302, time 302(202), time 302(212)) for a number of distributed transactions. Accordingly, when the estimated amount of time to update merge database 222 is approximately equal to or less than a characteristic distribution time such as represented in one embodiment by asymptote 570, merge manager 232 may direct the final updating of merge database instance 222 and the transfer of control of merge database instance 222 to active transaction manager 236 and active resource manager 225.

Figure 6:
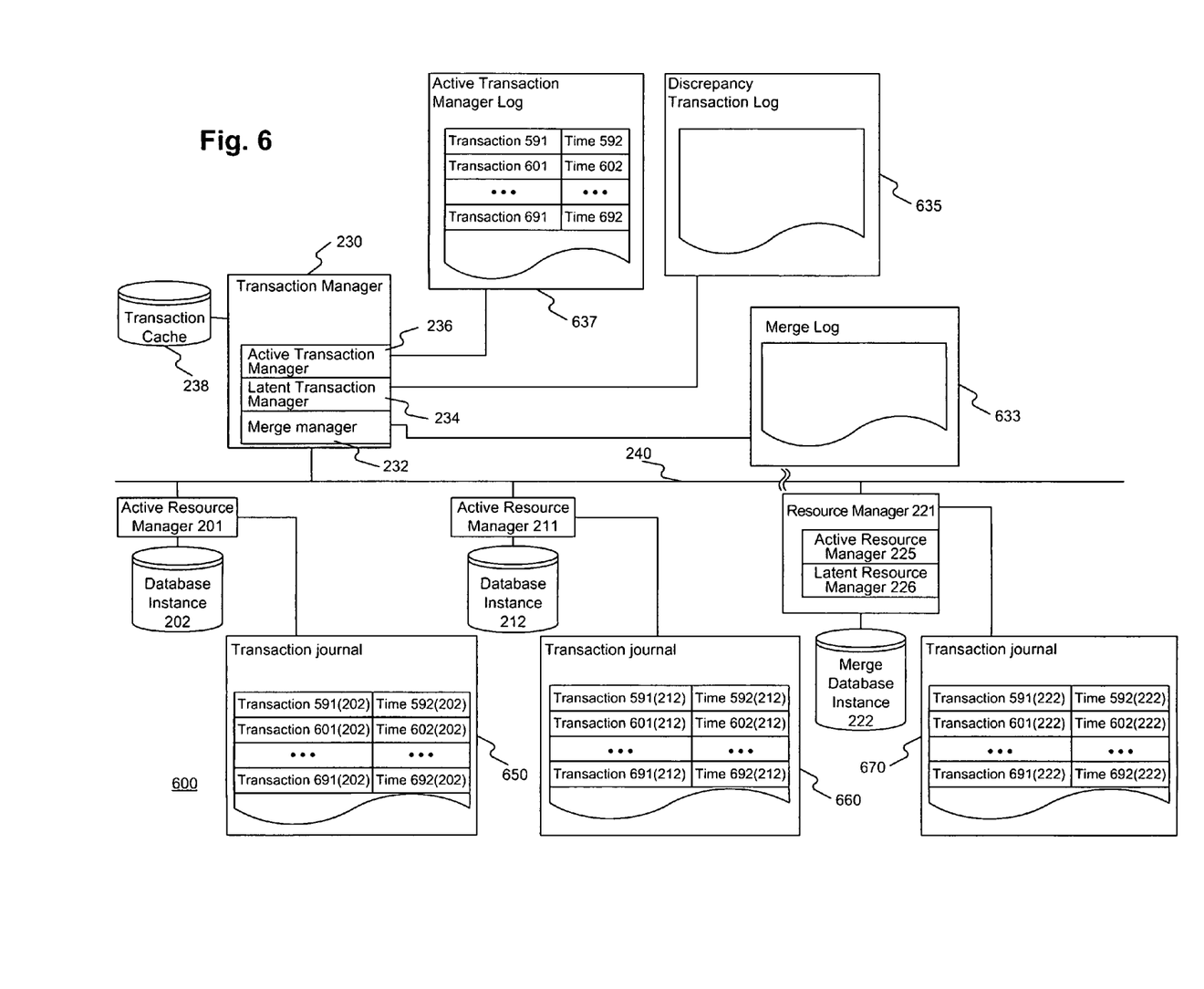
FIG. 6 depicts a view of a system for managing a distributed transaction process consistent with the methods and systems of the present invention after the merge database is brought into the active distributed transactions.

FIG. 6 depicts the system of FIGS. 2-4 at a time after which control of merge database instance 222 has been transferred to active transaction manager 236 and active resource manager 225. As is depicted in FIG. 6, a transaction journal 670 includes active transactions that are affiliated with those in a transaction journal 650 and a transaction journal 660.

Figure 7:
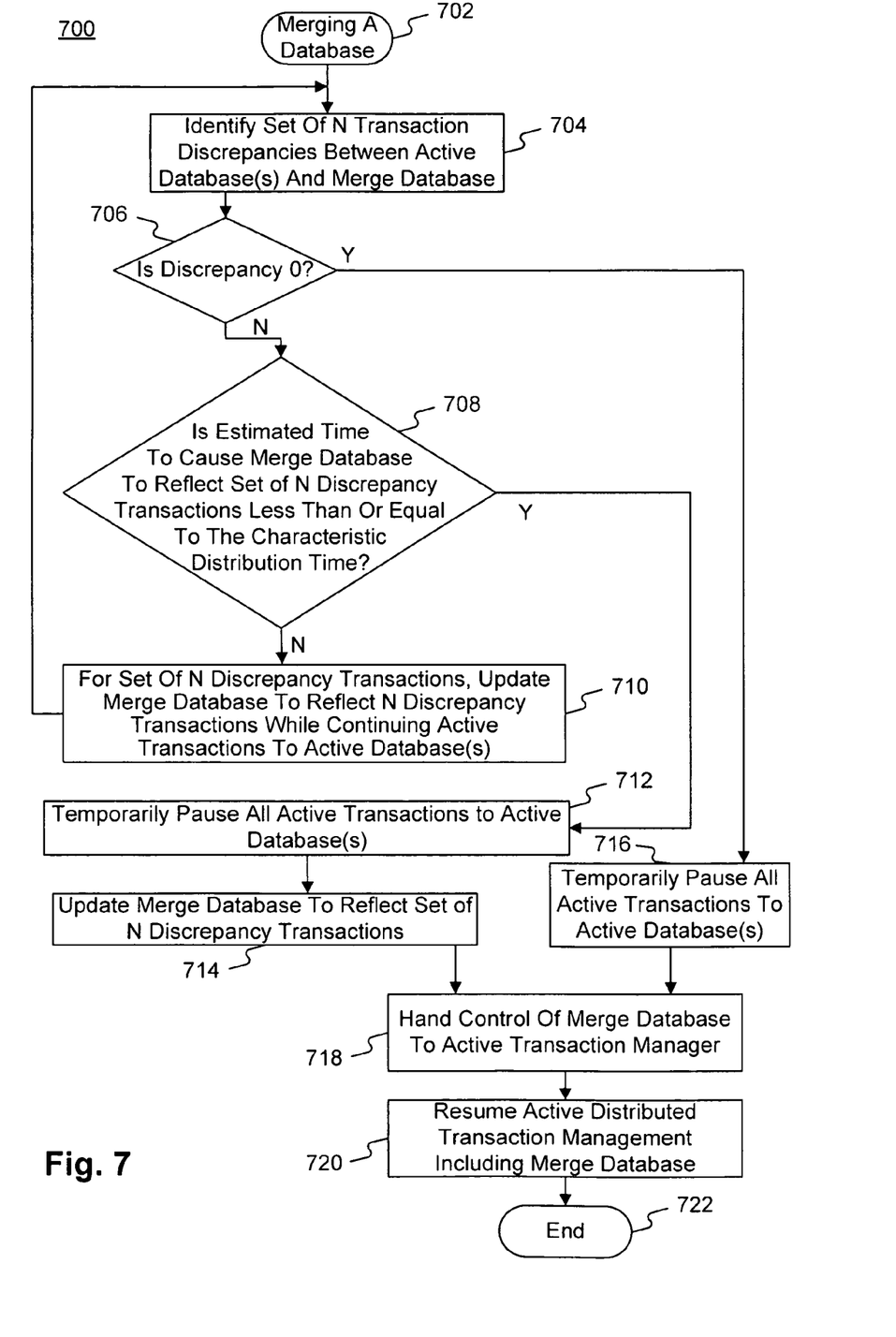
FIG. 7 is a flow chart illustrating a method of managing a distributed transaction process consistent with the present invention.

FIG. 7 depicts a method consistent with the present invention and with the transformation of the system depicted in FIGS. 2-4, and 6. Specifically, a step 704 depicts identifying a set of N transactions that have been committed to by the active databases (database instance 202 and database instance 212, for example) but that have not yet been committed to be the database to be merged (merge database instance 222, for example). As discussed earlier, the size of set N may represent the number of discrepancy transactions. A step 706 depicts determining whether the number of discrepancy transactions is zero. If this is the case, then control of the database to be merged may be simply handed over to the active transaction manager (for example, active transaction manager 236 and active resource manager 225) while the system is in a pause state (steps 716 and 718) and the system may proceed with subsequent distributed transactions including the merged database (a step 720).

On the other hand, if the number of discrepancy transactions is not zero, then a determination may be made as to whether the cost of pausing the system, updating the database to be merged, and proceeding is at an acceptable level. This may be performed, for example, by determining whether the estimated time to update the database to be merged is at or less than a characteristic distribution time (a step 708). If this is the case, the processing of the active distributed transactions to the active databases is temporarily paused (a step 712), the merge database is updated with the discrepancy transactions (a step 714), then control of the database to be merged is handed over the active transaction manager (for example, active transaction manager 236 and active resource manager 225) (a step 718) and the system may proceed with subsequent distributed transactions including the merged database (step 720).

Alternatively, if the cost of pausing the system, updating the database to be merged, and proceeding is at not at an acceptable level (step 708), then the system may simply update the database to be merged with the current set of discrepancy transactions while the active databases continue to accept the active transactions (a step 710). Following this step, the system may then return to step 704 by identifying the new set of transactions that have been committed to by the active databases (database instance 202 and database instance 212, for example) but that have not yet been committed to be the database to be merged (merge database instance 222, for example). The method may then proceed as described above with respect to step 706.

For example, and without limitation, one application that the present invention may be applied to includes the maintenance of multiple databases associated with Electronic Benefits Transfer and Electronic Payment Processing and Information Control (EPPIC) systems as described related U.S. patent application Ser. No. 10/379,733 filed Mar. 6, 2003 and hereinabove incorporated by reference.

When implemented to run on a JAVA Virtual Machine (JVM) in the EPPIC system, an embodiment of the present invention utilizes a persistence package to handle all high-level database access. The persistence package, for example, allows created objects and variables to continue to exist and retain their values between runs, and is dynamically configurable by the system management and by programmatic APIs (Application Program Interface). In one embodiment in the EPPIC system, persistence logging is used to ensure that database instances can be merged back into a distributed transaction process. For example, a persistence log database may be associated with each database instance. The physical database associated with the persistence log database may be the same physical database as the database instance. In such a case, when the database instance goes inactive, the persistence log database also goes inactive.

Moreover, the embodiment of the present invention in the disclosed EPPIC system is generally used for failover/failback purposes only. That is, the embodiment of the present invention for managing distributed transaction process is not generally used to migrate the entire contents of a database onto a blank new database. For example, in the embodiment of the present invention used in the EPPIC system, the persistence log databases are purged once they are no longer needed, such as when all EPPIC databases have committed to a transaction. To create a new database, however, one could manually take one database offline (including its persistence log database) and make a copy of the entire contents of the database and the corresponding persistence log database onto a new database. Afterwards, the entire system, including the new database with its corresponding persistence log database, may be resynchronized according to the system and method of the present invention.

In addition, in the embodiment of the present invention in the EPPIC system, all of the components of the EPPIC system that utilize the persistence layer and that perform the writes to the EPPIC databases should run within the same JVM. Moreover, those components of the EPPIC system that do not need to write to the EPPIC databases should be initialized to not use the persistence layer in their respective configuration files. One skilled in the art should appreciate, however, that the above recited implementation in the EPPIC system may be generalized according to the system and methods disclosed herein. Moreover, the invention is not limited to implementations in the JAVA programming environment. Other implementations are, of course, contemplated such as in C++, C, and C#, etc.

CONCLUSION

This invention is related to data management, and more particularly to a method and system for managing a distributed transaction process following a failure of such a process due to the loss of one database member of the distributed transaction.

The foregoing description of an implementation of the invention has been presented for purposes of illustration and description. It is not exhaustive and does not limit the invention to the precise form disclosed. One skilled in the art will appreciate from the foregoing description that modifications and variations are possible in light of the above teachings or may be acquired from practicing of the invention. For example, the steps associated with the present invention may be implemented as a combination of hardware and software or in hardware alone. Furthermore, although certain aspects of the present invention are described as being stored in memory, one skilled in the art will appreciate that these aspects may also be stored on or read from other computer-readable media, such as secondary storage devices, like hard disks, floppy disks, or CD-Rom; a carrier wave from the Internet; or other forms of RAM or ROM. Moreover, although certain aspects of the present invention are described with regard to database instances associated with long-term storage, one skilled in the art will appreciate that the database instances may also be associated with memory records loaded into temporary storage, such as RAM. Accordingly, the invention is not limited to the above-described embodiments, but instead is defined by the appended claims in light of their full scope of equivalents.

What is claimed is:

1. A method for synchronizing a first database with a second database, comprising:
    logging a first set of discrepancy transactions, wherein the first set of discrepancy transactions are a set of transactions reflected in the second database that are not reflected in the first database;
    updating the first database to reflect the first set of discrepancy transactions while continuing to accept additional transactions to the second database, wherein, while the first database is being updated to reflect the first set of discrepancy transactions, the first database does not accept the additional transactions;
    logging the additional transactions accepted to the second database as a second set of discrepancy transactions;
    determining whether a discrepancy between the first database that has been updated to reflect the first set of discrepancy transactions and the second database that has accepted the additional transactions is met by a configurable threshold; and
    when the discrepancy is met by the configurable threshold:
        halting accepting transactions to the second database,
        completing the updating of the first database to reflect the second set of discrepancy transactions, and
        resuming accepting transactions to the second database and the first database.

2. The method of claim 1, wherein:
    the discrepancy between the first database and the second database is a number of the discrepancy transactions between the first database that has been updated to reflect the discrepancy transactions and the second database that has accepted the additional transactions; and the configurable threshold is a predetermined number of discrepancy transactions.

3. The method of claim 1, wherein:
the discrepancy between the first database and the second database is an estimated time to complete the updating of the first database; and
the configurable threshold is a predetermined time.

4. The method of claim 1, wherein halting accepting transactions to the second database comprises:
halting accepting additional discrepancy transactions to the second database while continuing accepting other transactions to the second database.

5. The method of claim 1, wherein the second database is part of a distributed transaction system.

6. The method of claim 5, wherein completing the updating of the first database further includes:
adding the first database to the distributed transaction system.

7. The method of claim 6, wherein resuming accepting transactions to the second database and the first database comprises:
atomically committing transactions to the second database and the first database.

8. The method of claim 5, wherein the transactions reflected in the second database include a first set of transactions that are in the distributed transaction system and a second set of transactions that are not in the distributed transaction system.

9. The method of claim 8, wherein the discrepancy transactions are in the first set of transactions.

10. The method of claim 9, wherein halting accepting transactions to the second database comprises:
halting accepting additional transactions corresponding to the first set of transactions while continuing accepting additional transactions corresponding to the second set of transactions; and
wherein resuming accepting transactions to the second database and the first database comprises:
resuming accepting additional transactions corresponding to the first set of transactions.

11. The method of claim 1, wherein halting accepting transactions to the second database further includes:
recording the transactions.

12. The method of claim 11, wherein resuming accepting transactions to the second database and the first database further includes:
updating the second database and the first database with the recorded transactions.

13. The method of claim 1 further including:
managing a persistence log.

14. A system for synchronizing a first database with a second database, comprising:
a first database;
a second database; and
a processor, wherein the processor is configured to access the first database and the second database, including the operations of:
logging a first set of discrepancy transactions, wherein the first set of discrepancy transactions are a set of transactions reflected in the second database that are not reflected in the first database;
updating the first database to reflect the first set of discrepancy transactions while continuing to accept additional transactions to the second database, wherein, while the first database is being updated to reflect the first set of discrepancy transactions, the first database does not accept the additional transactions;
logging the additional transactions accepted to the second database as a second set of discrepancy transactions;
determining whether a discrepancy between the first database that has been updated to reflect the first set of discrepancy transactions and the second database that has accepted the additional transactions is met by a configurable threshold; and
when the discrepancy is met by the configurable threshold:
halting accepting transactions to the second database, completing the updating of the first database to reflect the second set of discrepancy transactions, and
resuming accepting transactions to the second database and the first database.

15. The system of claim 14, wherein:
the discrepancy between the first database and the second database is a number of the discrepancy transactions between the first database that has been updated to reflect the discrepancy transactions and the second database that has accepted the additional transactions; and
the configurable threshold is a predetermined number of discrepancy transactions.

16. The system of claim 14, wherein:
the discrepancy between the first database and the second database is an estimated time to complete the updating of the first database; and
the configurable threshold is a predetermined time.

17. The system of claim 14, wherein halting accepting transactions to the second database comprises:
halting accepting additional discrepancy transactions to the second database while continuing accepting other transactions to the second database.

18. The system of claim 14, wherein the second database is part of a distributed transaction system.

19. The system of claim 18, wherein completing the updating of the first database further includes:
adding the first database to the distributed transaction system.

20. The system of claim 19, wherein resuming accepting transactions to the second database and the first database comprises:
atomically committing transactions to the second database and the first database.

21. The system of claim 18, wherein the transactions reflected in the second database include a first set of transactions that are in the distributed transaction system and a second set of transactions that are not in the distributed transaction system.

22. The system of claim 21, wherein the discrepancy transactions are in the first set of transactions.

23. The system of claim 22, wherein halting accepting transactions to the second database comprises:
halting accepting additional transactions corresponding to the first set of transactions while continuing accepting additional transactions corresponding to the second set of transactions; and
wherein resuming accepting transactions to the second database and the first database comprises:
resuming accepting additional transactions to first set of transactions.

24. The system of claim 14, wherein halting accepting transactions to the second database further includes:
recording the transactions.

25. The system of claim 24, wherein resuming accepting transactions to the second database and the first database further includes:
  updating the second database and the first database with the recorded transactions.

26. The system of claim 14, the operations further including:
  managing a persistence log.

* * * * *